US008332287B2

(12) United States Patent  (10) Patent No.: US 8,332,287 B2
Gee et al.  (45) Date of Patent: Dec. 11, 2012

(54) METHODS AND APPARATUS FOR AUTOMATED DEPOSIT RECONCILIATION

(75) Inventors: Jasmine Gee, Allston, MA (US); Daniel Epstein, Somerville, MA (US); John Michael German, Waltham, MA (US); Laurie Mullin, Lynnfield, MA (US); Kate Levesque, Littleton, MA (US)

(73) Assignee: athenahealth, Inc., Watertown, MA (US)

( * ) Notice: Subject to any disclaimer, the term of this patent is extended or adjusted under 35 U.S.C. 154(b) by 188 days.

(21) Appl. No.: 12/790,014

(22) Filed: May 28, 2010

(65) Prior Publication Data

US 2011/0295725 A1  Dec. 1, 2011

(51) Int. Cl.
*G07B 17/00* (2006.01)
*G07F 19/00* (2006.01)
*G06F 15/02* (2006.01)
*G07C 1/10* (2006.01)

(52) U.S. Cl. ............................................ 705/30; 705/32
(58) Field of Classification Search .................. None
See application file for complete search history.

(56) References Cited

U.S. PATENT DOCUMENTS

2007/0033070 A1\* 2/2007 Beck et al. ...................... 705/2

\* cited by examiner

*Primary Examiner* — Paul Danneman
(74) *Attorney, Agent, or Firm* — Wolf, Greenfield & Sacks, P.C.

(57) ABSTRACT

Methods and apparatus for reconciling bank transactions with stored deposit entries in a practice management system. A plurality of bank transactions received from a bank are processed to select bank deposits from the plurality of bank transactions. A plurality of matching rules are used to automatically match at least some of the selected bank deposits with the stored deposits in the practice management system. A user interface enables a user to review the results of the automatic matching process and to manually match bank deposits to stored deposit entries. The user interface also enables users to reconcile stored deposit entries in the practice management system to bank statements to facilitate the preparation of month-end financial statements.

19 Claims, 9 Drawing Sheets

| | | athenaMailbox Deposit Dates | | | |
|---|---|---|---|---|---|
| | | 05/02/2009 ☐ to 06/01/2009 ☐ | | | |
| | | Last 30 Days ▼ Go | | | |
| | | Advanced Search  Show Non-athenaNet  Show Matched | | | |

*510*  *520*  *522* athenaMailbox Deposits — *514*

| ID | Match | Status | Deposit Date | Amount | Detail |
|---|---|---|---|---|---|
| 188 | ☐ | Unmatched | 05/29/2009 | $806.13 | ... |
| 166 | ☐ | Unmatched | 05/28/2009 | $971.11 | ... |
| 145 | ☐ | Unmatched | 05/27/2009 | $896.24 | ... |
| 124 | ☐ | Unmatched | 05/26/2009 | $817.97 | ... |
| 104 | ☐ | Unmatched | 05/22/2009 | $416.14 | ... |
| 88 | ☐ | Unmatched | 05/21/2009 | $1,244.45 | ... |
| 67 | ☐ | Unmatched | 05/20/2009 | $1,019.08 | ... |

FIG. 7 athenaMailbox Deposits — 510

| ID | Match | Status | Deposit Date | Amount | Detail |
|---|---|---|---|---|---|
| 188 | ☐ | Unmatched | 05/29/2009 | $806.13 | — |
| 166 | ☐ | Unmatched | 05/28/2009 | $971.11 | — |
| 145 | ☐ | Unmatched | 05/27/2009 | $896.24 | — |
| 124 | ☒ | Unmatched | 05/26/2009 | $817.97 | — |
| 104 | ☐ | Unmatched | 05/22/2009 | $416.14 | — |
| 88 | ☐ | Unmatched | 05/21/2009 | $1,244.45 | — |
| 67 | ☐ | Unmatched | 05/20/2009 | $1,019.08 | — |

Deposit Batches  Create New Deposit Batch — 610

| ID | Match | Action | Status | Deposit Date | Amount | Bank Account | Detail |
|---|---|---|---|---|---|---|---|
| 42441 | ☒ | ▨ | Unmatched | 05/27/2009 | $817.97 | Us Bank | — |
| 42242 | ☐ | ▨ | Unmatched | 05/27/2009 | $896.24 | Us Bank | — |
| 42024 | ☐ | ▨ | Unmatched | 05/21/2009 | $2,014.56 | Us Bank | — |
| 41608 | ☐ | ▨ | Unmatched | 05/20/2009 | $2,065.64 | Us Bank | — |
| 41609 | ☐ | ▨ | Unmatched | 05/20/2009 | $7,968.62 | Us Bank | — |
|  |  |  |  |  | $3,096.05 | Us Bank | — |

FIG. 8

METHODS AND APPARATUS FOR AUTOMATED DEPOSIT RECONCILIATION

BACKGROUND

In modern healthcare systems, individuals typically have access to a large number of healthcare payers which vary in their payment coverage for services rendered by medical practices. For example, some individuals may choose Fee-for-Service health insurance plans, whereas other individuals may choose to be covered by Health Maintenance Organizations (HMOs), Point-of-Service plans (POS), or Preferred Provider Organizations (PPOs). The complexities introduced by the large number of healthcare payer options available to patients of a medical practice may result in underpayment for services provided by the medical practice in the absence of an administrative system that can effectively resolve these complexities.

Ensuring that medical practices are properly reimbursed for the services that they provide to patients is an important consideration for the medical practices. Reimbursement is typically initiated by sending one or more claims describing a patient's medical services to a patient's healthcare payer. In turn, the payer remits payment to the medical practice or denies the claim based on the patient's healthcare coverage.

To assist in the processing of claims, some medical practices may contract with a third party which provides a practice management system for facilitating and tracking the status of claims submitted to the multitude of healthcare payers chosen by patients of the medical practice. For example, the practice management system may be a network-based system that enables billing personnel at a medical practice to view the status of claims submitted to a patient's healthcare payer to determine if and when remittance for the claims is received. If remittance is not received, the billing personnel may investigate the situation further to determine a reason for the denial of the claims so that additional steps may be taken to ensure that the claims are paid.

Many medical practices review their financial information in the form of financial statements, which provide a standard framework for summarizing and communicating financial information to outside entities, such as banks, investors, and state and federal tax agencies. To produce financial statements, a medical practice may rely on computerized accounting systems that record and categorize financial transactions that are entered into the accounting system on a daily, monthly, quarterly, or yearly basis. If the medial practice determines that the accounting equation of Assets=Liabilities+Owner's Equity does not balance, the medical practice may not be able to produce financial statements that are able to withstand financial statement audit scrutiny from outside entities such as federal and state tax agencies. In this situation, the medical practice may be said to not be able to "close."

Some medical practices may allow payers to remit payments for medical services to the third party which provides the practice management system. The third party may process the payments and may forward an electronic copy of the payments to a bank for deposit. In such arrangements, the practice management system may facilitate the preparation of financial statements for medical practices by recording deposit batches of payment information that is sent to banks on behalf of payers. When preparing financial statements, medical practices may use an accounting system or a general ledgers system to manually compare deposit entries in bank statements received from their bank to the recorded deposit batches stored by the practice management system to ensure that the financial statement for the medical practice balances. When the financial statements are prepared monthly, this process is often referred to as "Month-End Close."

SUMMARY

Some embodiments are directed to a method of reconciling a plurality of bank transactions with stored deposit entries in a practice management system. The method comprises selecting, with at least one processor, bank deposits from the plurality of bank transactions; automatically matching based, at least in part, on a plurality of rules, at least some of the bank deposits to the stored deposit entries in the practice management system; and displaying a user interface configured to enable a user to identify the bank deposits that have been automatically matched to the stored deposit entries.

Some embodiments are directed to at least one non-transitory computer-readable storage medium encoded with a plurality of computer-executable instructions that, when executed by at least one processor, perform a method of reconciling a plurality of bank deposits with stored deposit entries in a practice management system. The method comprises selecting, with at least one processor, bank deposits from the plurality of bank transactions; automatically matching based, at least in part, on a plurality of rules, at least some of the bank deposits to the stored deposit entries in the practice management system; and displaying a user interface configured to enable a user to identify the bank deposits that have been automatically matched to the stored deposit entries.

Some embodiments are directed to a computer system, comprising at least one processor programmed to select bank deposits from the plurality of bank transactions; automatically match based, at least in part, on a plurality of rules, at least some of the bank deposits to the stored deposit entries in the practice management system; and display a user interface configured to enable a user to identify the bank deposits that have been automatically matched to the stored deposit entries.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The accompanying drawings are not intended to be drawn to scale. In the drawings, each identical or nearly identical component that is illustrated in various figures is represented by a like reference character. For purposes of clarity, not every component may be labeled in every drawing. In the drawings:

FIG. 4 is a review summary page of user interface configured to display bank deposits and stored deposit entries in a practice management system in accordance with some embodiments of the invention;

FIG. 5 is a detailed view of a mailbox deposit portion of the review summary page of the user interface shown in FIG. 4;

FIG. 7 is a portion of the user interface shown in FIG. 4 described in connection with a manual matching process in accordance with some embodiments of the invention;

FIG. 8 is a portion of the user interface shown in FIG. 4 described in connected with a manual matching process in accordance with some embodiments of the invention.

DETAILED DESCRIPTION

The present disclosure generally relates to inventive methods and apparatus for reconciliation of deposits in a cash management system, and more specifically relates to a cash management system in which bank transactions are matched to deposit batch information stored by a practice management system provided by a third party. To this end, some embodiments of the invention are directed to methods and apparatus for automated matching of bank deposit transactions to stored deposit entries based, at least in part, on a plurality of rules employed by a practice management system.

Medical practices often rely on their own accounting system or a general ledger system to perform deposit reconciliation by manually matching deposit transactions appearing on their bank statements with deposit batch information stored by a practice management system. Applicants have recognized and appreciated that this deposit reconciliation process may be improved by automatically matching bank deposit transactions appearing in a medical practice's bank account to stored deposit batch information using one or more algorithms and/or rules that identify common matching patterns. By automating the matching process, all deposits for a medical practice may be reconciled periodically throughout the month rather than being reconciled all at once at the end of the month. Additionally, bank deposit transactions that are not automatically matched may still be manually matched periodically throughout the month by an administrator at a medical practice, thereby facilitating the process of generating financial statements.

Figure 1:
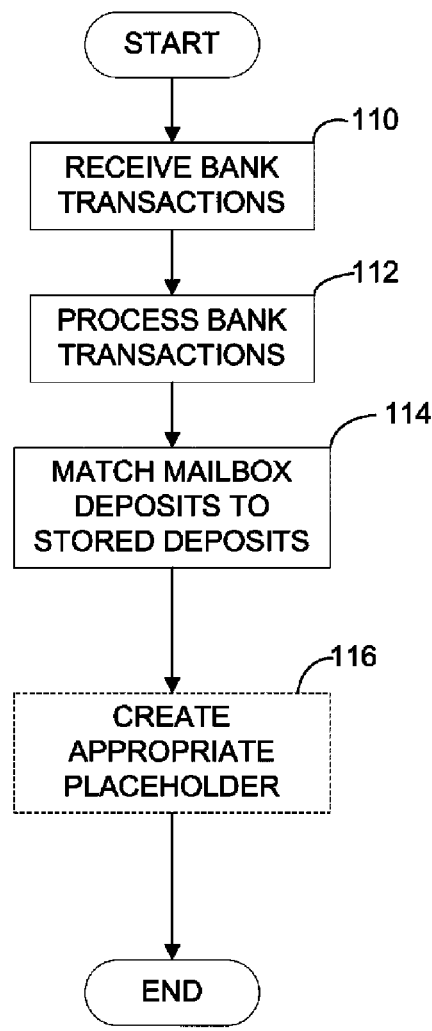
FIG. 1 is flow chart of a process for automated deposit reconciliation in accordance with some embodiments of the invention.

FIG. 1 illustrates a flow chart of a process for automated deposit reconciliation in accordance with some embodiments of the invention. In act 110, a plurality of bank deposit transactions is received by a processing system such as a computer operating as part of a practice management system. The plurality of bank deposit transactions may be formatted in any way, and aspects of the invention are not limited in this way. For example, in some embodiments, a bank (or multiple banks) may transmit an electronic file to the practice management system over a network, wherein the file includes all of the bank transactions for the bank on a particular day. Alternatively, the bank may simply inform the practice management system that a file including all of the bank transactions may be downloaded from a secure server at the bank via a network. The plurality of bank transactions may alternatively be received in any other way including, but not limited to, being provided by the bank in a non-electronic format. If received in a non-electronic format, the bank transaction statement may be converted to an electronic format by scanning, or any other suitable technique, in preparation for further processing. Additionally, the file may include all transactions for the bank during a specified period of time (e.g., one day) or the file may include only bank transactions for medical practices that have contracted with the third party providing the practice management system, and aspects of the invention are not limited in this respect. The file may be received from the bank at any suitable time intervals such as once a day or multiple times a day and embodiments of the invention are not limited in this respect.

Security of financial information is often of paramount importance to businesses. Accordingly, in some embodiments, at least some of the information (e.g., account numbers) in the bank transactions received from one or more banks may be encrypted prior to or during transmission of the bank transaction information from the bank to the practice management system. The financial information may be encrypted in any suitable way and embodiments of the invention are not limited in this respect.

Figure 2:
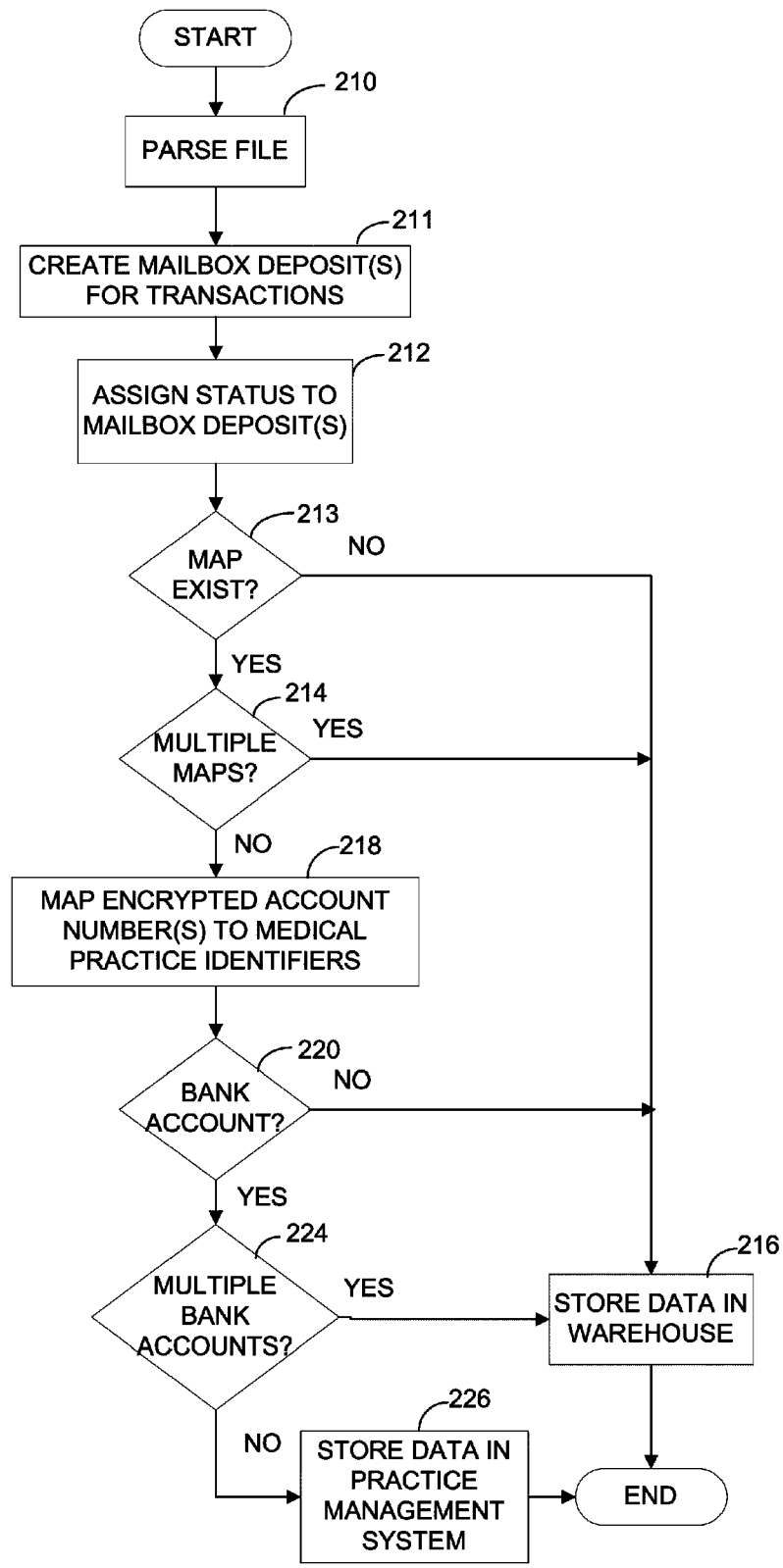
FIG. 2 is a flow chart of a process for parsing an electronic file comprising bank transactions in accordance with some embodiments of the invention.

A file received from a bank may include a plurality of accounts with each account including one or more bank transactions. Prior to matching the bank transactions with the stored deposit entries in the practice management system, in act 112, the information in the file may be processed to prepare the information for an automated matching process. FIG. 2 illustrates a flow chart for processing received files in accordance with some embodiments of the invention. In act 210, the file is parsed to determine information for each transaction in the file. The information may include the bank account number, to be securely encrypted before being stored, for the transaction, the deposit date (if the file is received every day, this may be the same for all transactions in the file), the type of the transaction (e.g., deposit, withdrawal, credit card payments, etc.), the transaction amount, and other data associated with the transaction. In some embodiments, a payer identifier, merchant ID, or other information may also be parsed from the data and the payer identifier may be used to facilitate the automated matching process described below.

In act 211, each of the transactions in the received file may be converted to a "mailbox deposit", or bank deposit. In embodiments in which a payer identifier or other information has been parsed from the transaction's raw data, the mailbox deposit may be associated with a payer ID and/or other characteristics.

Each mailbox deposit may be categorized as a specific type, and the category assigned to a given mailbox deposit may relate to a particular matching algorithm that may be used when attempting to match the mailbox deposit. For instance, Check Remittance mailbox deposits may match with deposit entries in the practice management system and EFT Remittance mailbox deposits may match with remittance entries; both of these processes are described in further detail below. Some types may also indicate mailbox deposits that may not be automatically matched to entries in the practice management system, but rather may be manually matched by application users, as described in further detail below. The logic that governs categorization may be simple or complex and may rely on multiple characteristics of the mailbox deposits. Additionally, some of the logic may be defined and updated via a user interface that is accessible to administrators of the practice management system.

In act 212, a status may be assigned to each mailbox deposit indicating the processing state of the mailbox deposit (e.g., "unmatched," "discarded," etc.). It should be appreciated that the mailbox deposit statuses and types described above are merely exemplary statuses and types of mailbox deposits.

Further acts may be executed on mailbox deposits that have been associated with a particular category. For example, if a mailbox deposit has been categorized as EFT Remittance, a search may be executed for the mailbox deposit's corresponding ACH record, which may have been retrieved from the bank by the practice management system in a separate data file, one that describes ACH deposits in greater detail. If a mailbox deposit finds such a record, this record may contain a reassociation trace number, or 'EFT number', that the mailbox deposit can inherit. The EFT number may be used in the EFT Remittance matching algorithm described below.

After the mailbox deposits have been created and classified, the encrypted bank account numbers may be mapped to one or more medical practice identifiers using one or more conversion maps stored by the practice management system. For example, each encrypted bank account number may be mapped to a single medical practice and an "owner code," which is an identifier that, for security purposes, can be used in lieu of the actual bank account number. Some encrypted account numbers in the received file may not be associated with a conversion map because the corresponding bank customer for the account may not be a medical practice that has a contract with the practice management system to perform this service. In act 213, it is determined whether a map exists for an encrypted bank account number. If a map is not found, the associated transaction data may not be processed completely and in act 216, the data may be securely stored. For example, in act 216, the data may be stored in a warehouse database or some other storage location. However, if a map is found for an encrypted bank account number, in act 214, it is determined whether multiple maps exist for the encrypted bank account number. If more than one map is found for the encrypted bank account number, in act 216, the associated transaction data may be securely stored.

In act 218, the accounts in the received bank transaction file are associated with the medical practice identifiers and, in act 220, it may be determined whether a medical practice has a bank account stored on the practice management system with the same owner code associated with the account in the received bank transaction file. If no bank account is found, in act 216, the data may be stored. However, if a bank account is found for the medical practice, it may be determined in act 224 whether multiple bank accounts exist for the medical practice. If it is determined that multiple bank accounts exist, in act 216, the data may be stored (e.g., in a warehouse database). If it is determined in act 224 that multiple bank accounts do not exist for the medial practice, in act 226, the data may be stored in the practice management system and the process ends.

A periodic automated process may review all bank data that has been stored (e.g., in a warehouse database) due to nonexistent owner code mappings or bank account configurations, or ambiguities in the maps or configurations. If any such problems have since been resolved, the data may be automatically transferred into the correct medical practice, where it may be automatically placed in a queue for the matching algorithms described below. Any data that remains in storage (e.g., in a warehouse database) after this examination may be brought to the attention of a practice management system administrator, such as by sending an automated e-mail to the administrator so that they may resolve the mapping or configuration problem(s).

Figure 3:
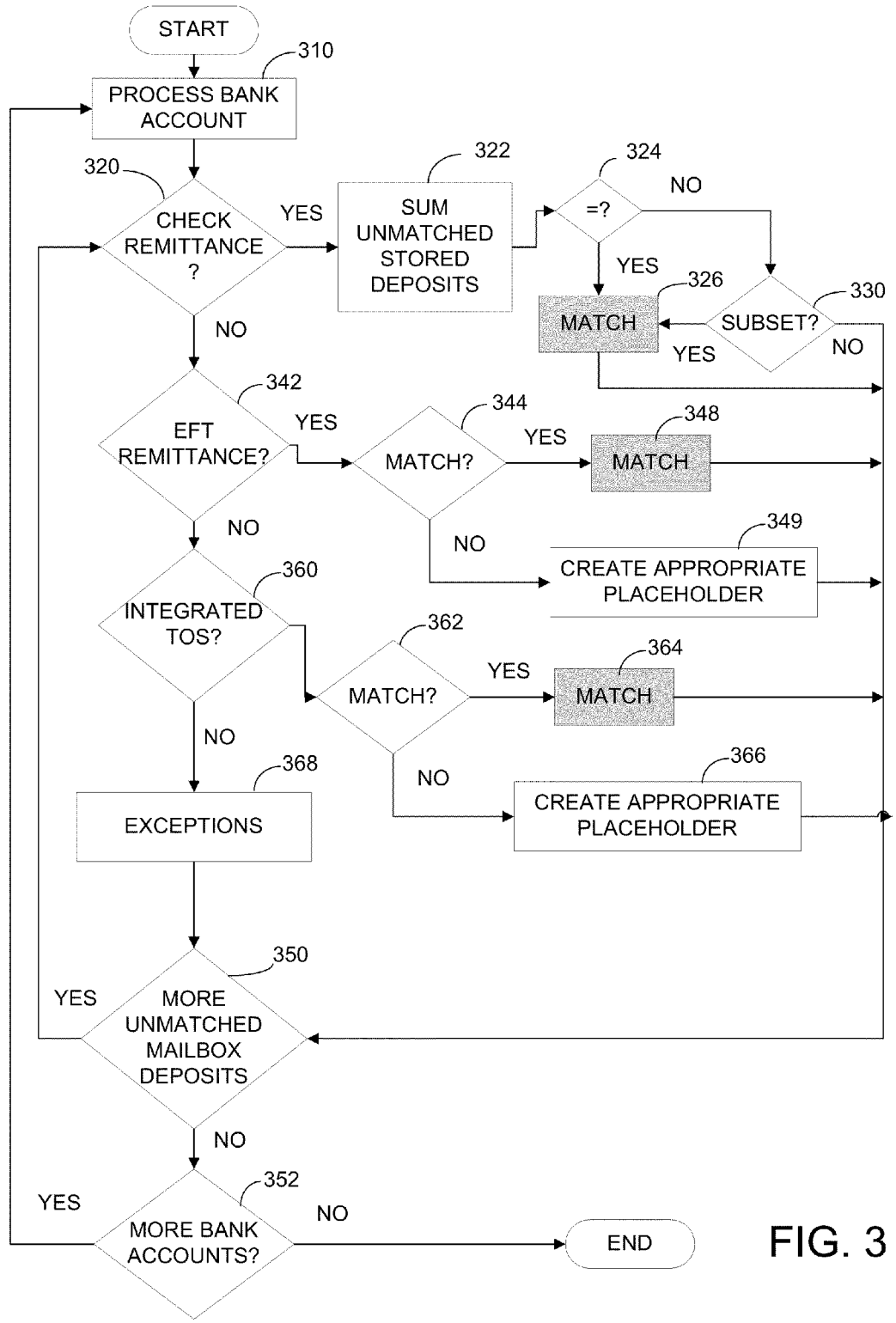
FIG. 3 is a flow chart of a process for automatically matching bank deposits to stored deposit entries in a practice management system in accordance with some embodiments of the invention.

Returning to FIG. 1, after the bank transactions in the received file have been processed, in act 114, the mailbox deposits may be automatically matched to stored deposit entries in the practice management system. FIG. 3 illustrates a flow chart for an exemplary automated matching process in accordance with some embodiments of the invention. In act 310, a bank account for a medical practice is selected for matching unmatched mailbox deposits in the bank account with stored deposits, remittances, or other entries in the practice management system. In some embodiments, matching may iterate based on the 'deposit date' characteristic of mailbox deposits, with similarly deposited entries being matched in the same iteration.

The process control continues to act 320, where it is determined whether there are any unmatched customer deposits from dates prior to the deposit date presently being examined. For example, it may be determined in act 320 if there are any unmatched customer deposit mailbox deposits in any of the past X days (e.g., 14 days). Unmatched customer deposits may result, for example, from improperly coded stored deposit entries (e.g., deposit batches) in the practice management system, or from a failure of one of several automated or manual processes from being executed on one of these days. Relatively recent unmatched customer deposits (e.g., from the past 7 days) may be brought to the attention of an administrator of the practice management system in any suitable way, and workflows may be followed to manually resolve these items and/or manually match them to mailbox deposits. Older unmatched customer deposits (e.g., from past days 8-14) may be automatically offset in the practice management system with generic placeholder financial transactions with relevant data elements attached and placed in a queue to be addressed in a standard workflow.

For any mailbox deposits found for the present deposit date, in act 322, the amounts for all of the unmatched stored customer deposit entries for that date are added and it is determined in act 324 whether the sum is equal to the amount of the identified unmatched mailbox deposits. If it is determined in act 324 that the sum is equal to the sum of the mailbox deposits, in act 326, the group of unmatched stored deposit entries are matched to the mailbox deposits. However, if the sum is not equal to the amount of the unmatched mailbox deposits, in act 330 it is determined whether a subset of the unmatched stored deposit entries can be identified that has the same value as the unmatched mailbox deposit. If a subset is found, in act 326, the subset of unmatched stored deposit entries is matched to the unmatched mailbox deposit, with the remaining entries that were not included in the subset being forward-dated by one business day, presuming that these entries may have been recorded by the bank as being deposited then. Any deposit entries that remain unmatched after having been forward-dated by one business day may be offset in the practice management system by a generic financial transaction with relevant data elements attached and placed in a queue to be addressed in a standard workflow.

If it is determined that there are no unmatched customer deposits, the process control continues to act 342, where it is determined whether there are any unmatched EFT stored deposit entries from the past X days (e.g., 30 or 60 days). If any unmatched EFT stored deposit entries are found, they are ordered by deposit date, and the process control continues to act 344, where the set of unmatched EFT mailbox deposits and the set of unmatched EFT stored remittance information entries (e.g. EOB documents or ERA files) are examined for matches.

To facilitate the correct matching of EFT mailbox deposits to remittance entries, the practice management system may construct a map from the 'company IDs' (payer IDs) found in EFT mailbox deposits to notion of payers used in the practice management system, one of which is assigned to all remittance entries. By way of this map, the set of remittance entries that are eligible to be matched to a given EFT mailbox deposit may be defined. This payer map may be manipulated by practice management system administrators by way of a user interface. Periodically, an automated process may evaluate all of the EFT matching that has been made in medical practices over the past X days (e.g. 30 days). This process may send a report to an administrator of the practice management system that indicates how the payer map might be improved upon, based on the data it has analyzed.

Those mailbox deposits that have been associated with EFT numbers may be matched without ambiguity to remittance entries. If a set of non-unique matching entries are found, or if a unique match is found that violates the payer map, bank account associations, or other application rule, no match may be made and in act 349, this information may be attached to an appropriate placeholder entry that serves as a placeholder match for the EFT mailbox deposit. If a unique remittance entry match is found that has previously been matched to an EFT mailbox deposit that was not associated with an EFT number, the remittance entry is unmatched from this mailbox deposit and then matched to the one with the EFT number, and the now unmatched EFT mailbox deposit is placed in a queue to be rematched to a different remittance entry.

Unmatched EFT mailbox deposits without EFT numbers may be matched to remittance entries based on a heuristic using, for example, the criteria of amount, bank account, and payer map, with any ties being resolved by deposit date comparisons.

The practice management system may also implement special matching logic for medical practices who have recently acquired automatic matching functionality and whose EFT remittance entries may have been automatically opened without confirmation of deposit, and which should now be matched to EFT mailbox deposits.

For medical practices participating in automated matching, the payments and other financial transactions that comprise EFT remittance entries may not be posted to the associated medical claims in the practice management system until they have been matched to EFT mailbox deposits, this being considered the confirmation that the remittance deposit has been made. After having been matched to an EFT mailbox deposit, remittance entries may be automatically posted to the associated medical claims.

Referring back to FIG. 1, in act 116, any mailbox deposits that have not been matched to remittance entries after having searched for them through the applicable process as described above may be represented in the practice management system with an appropriate placeholder entry that may contain relevant information about the unmatched deposit.

The practice management system may initiate a search for matching remittance entries that have already been posted, erroneously, i.e., without proper confirmation of their deposit to unmatched mailbox deposits that are represented by an appropriate placeholder entry. Any such potential matches that are found may be brought to the attention of an administrator of the practice management system for resolution, e.g., via a workflow.

After an appropriate placeholder entry has been created to represent an unmatched mailbox deposit, the practice management system may continue to search for matching remittance entries periodically (e.g. once per day), in case the matching remittance entry has recently been received by the practice management system. Similarly, the practice management system may search for a matching appropriate placeholder for all new mailbox deposits as they are being processed. Additionally, practice management system administrators may have access to a user interface where they can review worklists of unmatched deposits, unmatched remittance entries, and matched pairs of EFT deposits and remittance entries. Using this user interface, administrators may manipulate matched pairs or create new matches. Reviewing such items may include searching for 'duplicate' remittance or deposit entries have been created erroneously.

When an mailbox deposit currently represented by an appropriate placeholder entry is ultimately matched to a remittance entry, the appropriate placeholder entry ceases to represent financial data, and the monetary representation of the deposit may become the transactions in that remittance as they are posted against medical claims in the practice management system.

After an appropriate placeholder entry has existed for some number of days (e.g. 14 days), it may be automatically placed in a queue in a workflow for practice management system administrators to review and follow up on. This review and follow up may consist of, for example, contacting the payer of the unmatched deposit and/or its payee (the medical practice) to try to locate the remittance entry so that it may be inserted into the practice management system and matched to the unmatched mailbox deposit currently represented by the appropriate placeholder entry. While performing this exercise, administrators may have at their disposal all of the relevant characteristics of the EFT deposit, these having been parsed out of the bank file(s) and attached to the corresponding appropriate placeholder entry.

Referring back to FIG. 3, in act 360 it is determined whether there are any time-of-service (TOS) mailbox deposits, which represent money collected via a credit card and/or check processing application that has been integrated into the practice management system. For particular medical practices, this integrated application may include information about contracts that the practice has with particular credit card companies. For example, a practice may process American Express payments under a particular merchant ID (MID) that entails a three business day delay between payment collection and the depositing of these funds into the practice's bank account, and a 2.25% reduction from each such deposit representing the fee claimed by American Express. This contract data informs the characteristics of the 'payment batches' that are automatically created as medical practice staff use the integrated application to collect TOS payments, assigning them for example to the correct MID and the correct expected date of deposit.

If TOS mailbox deposits are found, in act 362, it may be determined if any TOS mailbox deposits for the deposit date being examined match the payment batches for the same MID and expected deposit date. When applicable, the amount of the expected credit card company fee may be calculated based on the sum of these mailbox deposits and the contract information associated with them. This fee may be represented in the practice management system by an appropriate placeholder entry. In act 364, the mailbox deposits are then matched to the set of payment batches that have the same MID and deposit date, including the one containing the just-generated 'fee' placeholder if present. If the sums of these two sets do not match exactly, an offsetting 'discrepancy' placeholder may be created in the practice management system to account for the difference, and the administrators of the practice management system are alerted by automated e-mail of its existence in order to address any problem that may have lead to the discrepancy's existence.

Unmatched TOS payment batches associated with integrated MIDs from previous days may then be queried for. Any that are found and that are relatively recent, e.g., expected to be deposited within the past 7 days, may be brought to the attention of the practice management system administrators by way of an automatically generated e-mail or in any other suitable way. In act 366, unmatched TOS payment batches that are older may be associated with an appropriate placeholder in the practice management system.

If it is determined that there are no TOS mailbox deposits, in act 368, other mailbox deposit entries from the date in question that have been identified as being relevant to particular workflows ('exception' mailbox deposits) are then iterated through and represented in the practice management system as placeholders of the appropriate type. Categories of such mailbox deposits may include, but are not limited to, 'Returned Items', 'Encoding Errors', 'Deposit Location Errors', 'Cashed Checks' and 'Payer Debits'. These placeholders are then placed in a queue to be examined by the appropriate practice management system user, or may instead be automatically processed by other mechanisms (not illustrated). For example, cashed checks may be automatically matched to the corresponding 'Cut Check' placeholder entries that may have been created when a medical practice wrote a check out of their bank account, and returned items (patient or payer checks) may be automatically matched to their preexisting representations in the practice management system, and the contained payments against claims or patient accounts automatically voided.

When it is determined in act 352 that all bank accounts have been processed, the automated matching process ends. Although only four matching algorithms or rules have been discussed above in connection with the automated matching algorithm depicted in FIG. 3, it should be appreciated that any other suitable rules may additionally or alternatively be used to perform automated matching of bank deposits and stored deposit, payment or remittance entries and embodiments of the invention are not limited in this respect. Additionally, the rules of Check Remittance, EFT Remittance, and Integrated TOS have been illustrated and described as being serially applied in the automated matching process illustrated in FIG. 3. However, it should be readily appreciated that one or more of the above-described rules (or any other rules not depicted) may be applied to unmatched mailbox deposits and unmatched stored deposit, payment, or remittance entries in any order either serially or in parallel, and the precise manner in which the rules are applied to the unmatched deposit, payment or remittance entries is not a limiting aspect of embodiments of the invention in any way.

Figure 4:
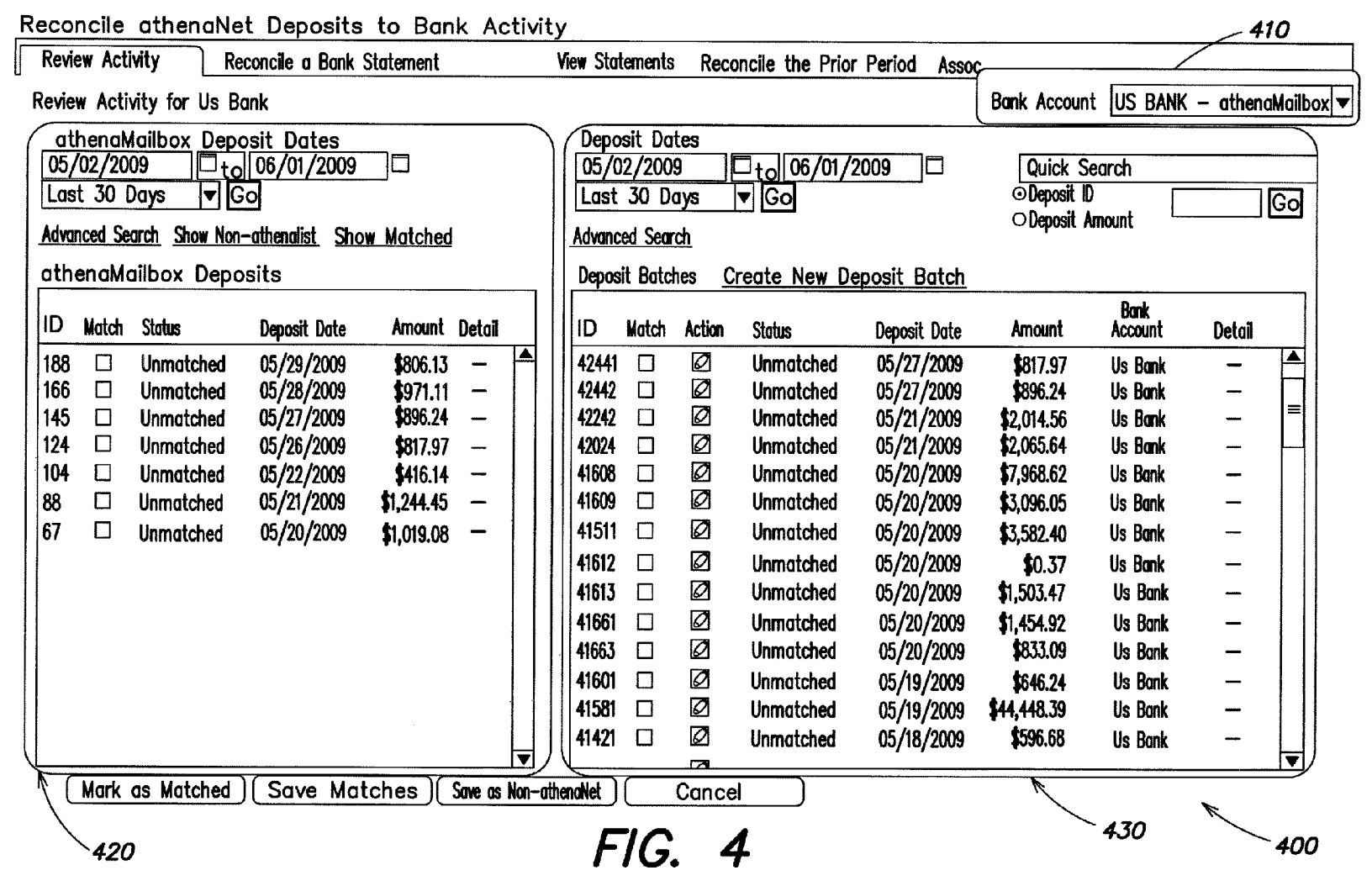

In addition to automated deposit reconciliation described above in connection with FIGS. 1-3, some embodiments are also directed to a user interface that enables users to perform manual deposit reconciliation. FIG. 4 illustrates a review activity page 400 of an exemplary user interface in accordance with some embodiments of the invention. Review Activity page 400 enables a user to match deposit batch entries stored in the practice management system with bank deposits received by the practice management system from a medical practice's bank account. A user may interact with review activity page 400 to review the results of an automated matching process, such as the process described above. After automated matching is performed, deposits are associated with a status that indicates whether the deposit has been matched or not. In some embodiments, the status may be either "Matched," indicating that the automatic matching process matched a mailbox deposit with a deposit batch entry, "Unmatched," indicating that the automatic matching process did not find a match, or "N/A" indicating that the bank transaction should not be matched to a deposit batch entry in the practice management system.

Review activity page 400 comprises bank account indicator 410, which identifies the bank account currently being used to display the bank transactions and the corresponding deposit batch entries. In some embodiments, if there is more than one bank account assigned to a medical practice, the first bank account in the list may be used as a default. However, it should be appreciated that any of the bank accounts in the list may alternatively be used as a default and embodiments of the invention are not limited in this respect.

Review activity page 400 also comprises deposits area 420 and deposit batches area 430. FIG. 5 illustrates a more detailed view of deposits area 420. Deposits area 420 includes a mailbox deposit list 510 of unmatched mailbox deposits from the bank account specified in bank account indicator 410. Each entry in mailbox deposit list 510 comprises deposit ID 512, status indicator 514, deposit date 516, and an amount 518 of the mailbox deposit. Information in each entry may be used to perform manual matching of mailbox deposits in mailbox deposit list 510 with deposit batch entries in deposit batches area 430, as will be described in more detail below. In some embodiments, unmatched mailbox deposits from the previous thirty days may be shown in mailbox deposit list 510 by default. However, deposits area 420 also comprises date selection area 520, which enables the user to specify a date range in which mailbox deposits should be shown in mailbox deposit list 510. For example, choosing a different date range and selecting "Go" button 522 may result in an update of the mailbox deposits shown in mailbox deposit list 510 based on the specified date range.

Figure 6:
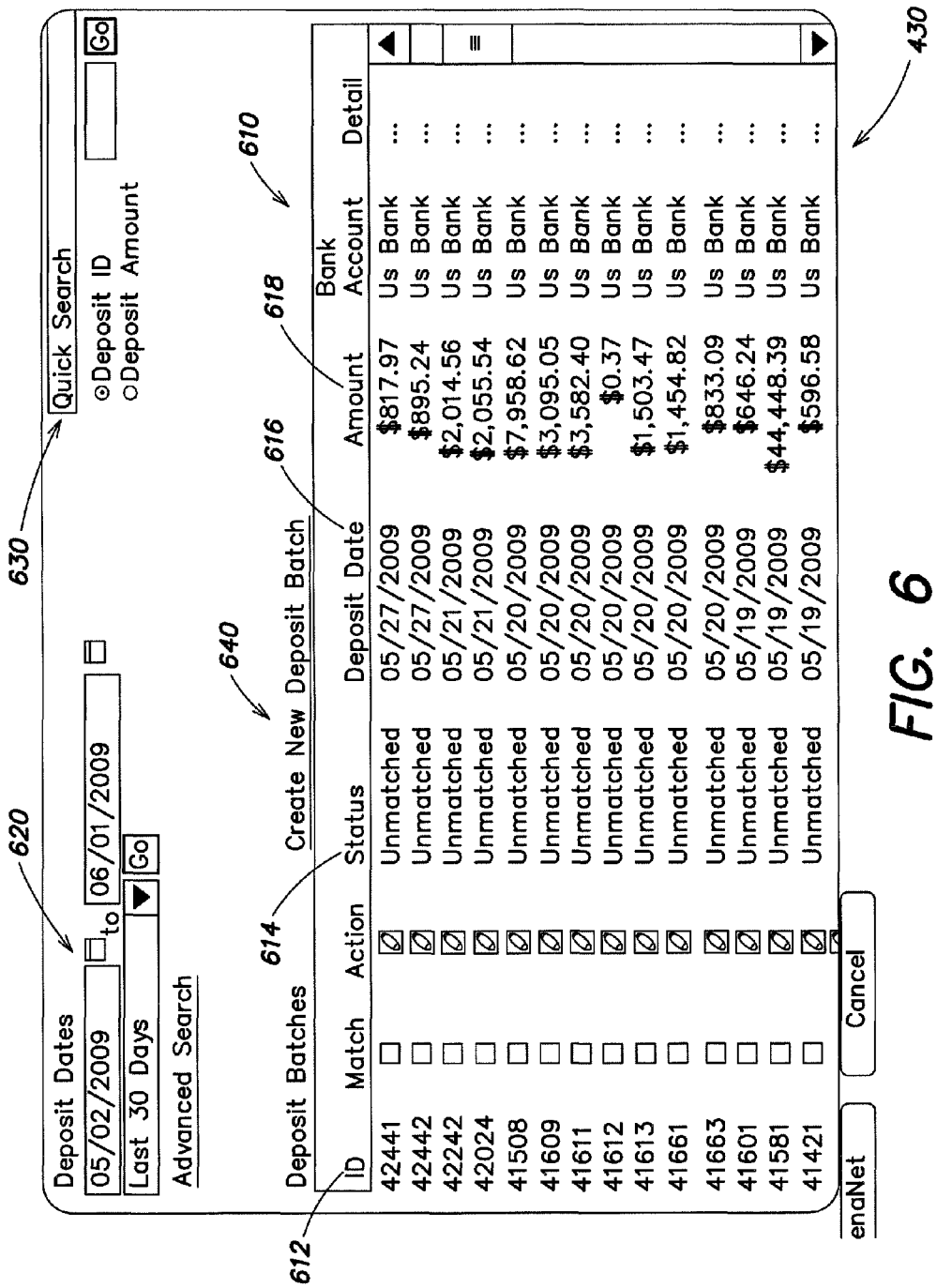
FIG. 6 is a detailed view of a deposit batches portion of the review summary page of the user interface shown in FIG. 5.

FIG. 6 illustrates a more detailed view of deposit batches area 430 in accordance with some embodiments of the invention. Deposit batches area 430 comprises deposit batch list 610, which lists all unmatched deposit batch entries from the bank account specified in bank account indicator 410. In some embodiments, deposit batches that are not associated with a bank account may also be shown in deposit batch list 610. Each entry in deposit batches list 610 comprises deposit batch ID 612, status indicator 614, deposit date 616, and an amount 618 of the deposit batch entry. Status indicator 614 displays the status of the deposit batch (e.g., "Unmatched," "Matched," "Reconciled"). In some embodiments, amount 618 may be presented in a different format (e.g., color, style, etc.) if the amount is negative. Deposit batches area 430 also includes date selection area 620, search area 630, and deposit batch creator 640. Deposit batch creator 640 may be configured to enable a user to create a new deposit batch entry for an unmatched mailbox deposit (e.g., when an unmatched mailbox deposit doesn't appear to match any of the unmatched deposit batches).

In some embodiments, unmatched deposit batch entries from the previous thirty days may be shown in deposit batch list 610 by default. However, date selection area 620 enables the user to specify a date range in which deposit batch entries should be shown in deposit batch list 610. Additionally, a user may interact with search area 630 to search for and display in deposit batch list 610, deposit batch entries with either a particular deposit batch ID 612 or deposit amount 618.

Figure 7:
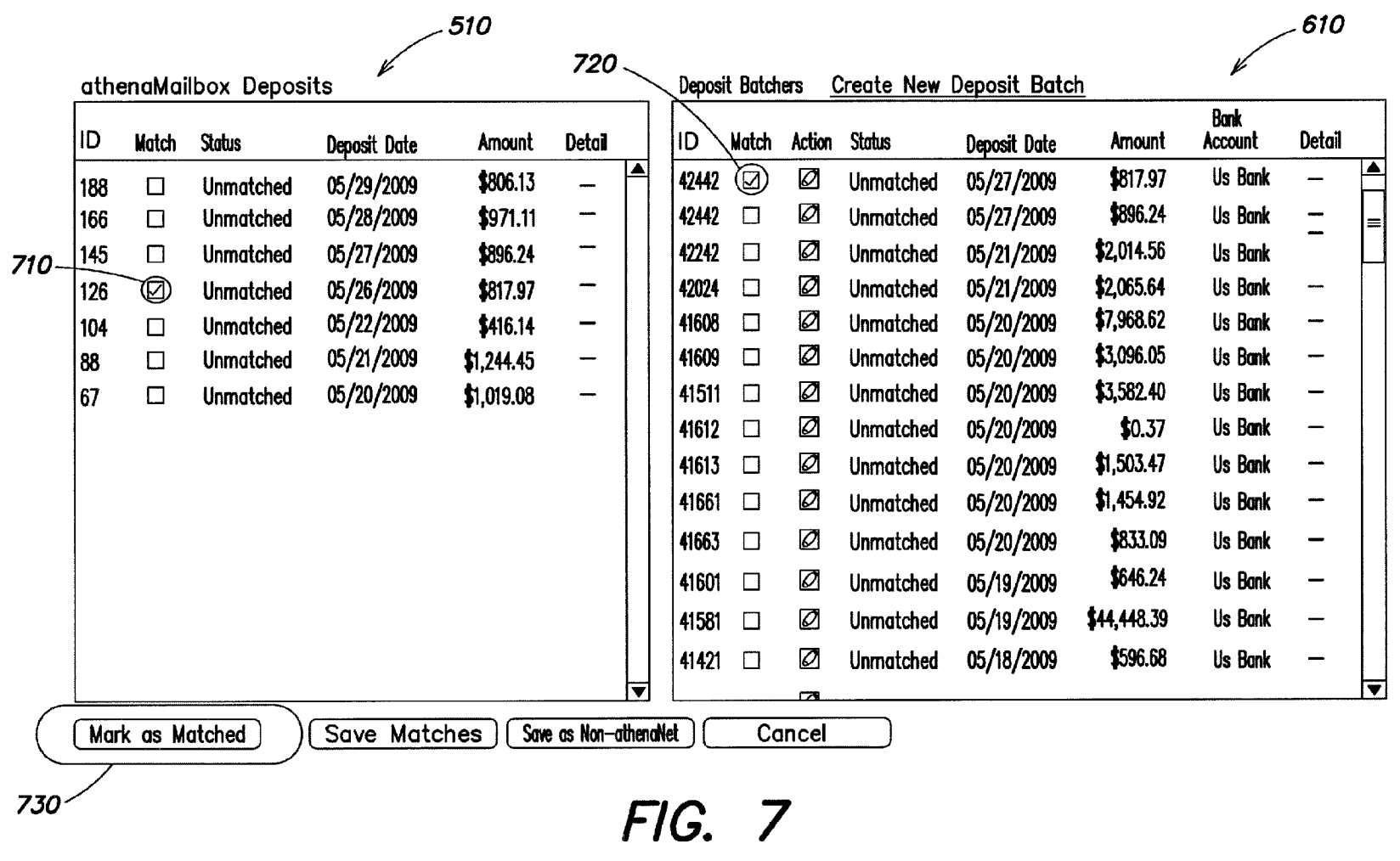

Manual matching of mailbox deposits displayed in mailbox deposit list 510 and deposit batch list 610 is now described with reference to FIG. 7. A user may select a mailbox deposit in mailbox deposit list 510 by interacting with a selection area 710 of the desired mailbox deposit. One or more deposit batches listed in deposit batch list 610 may be selected by interacting with selection area 720 of the desired deposit batch(es). In review activity page 400, selection area 710 and selection area 720 are each illustrated as a checkbox that a user may select with a mouse, key press, or other input means. However, it should be appreciated that selection area 710 and/or selection area 720 may comprise any suitable type of selection control including, but not limited to, a radio button and a drop down menu, and embodiments of the invention are not limited in this respect. To match the selected mailbox deposit with the selected deposit batch(es), the user may interact with matching selector 730.

In some embodiments, as shown in FIG. 8, after matching has been performed, mailbox deposits and their corresponding matching deposit batch(es) may be identified by selecting a mailbox deposit in mailbox deposit list 510 or a deposit batch entry in deposit batch list 610. Selection of the mailbox deposit or a deposit batch entry may result in matching deposits to be highlighted or be otherwise indicated as being matched. Additional matches between mailbox deposits and deposit batch(es) may be made by repeating the process for manually matching as described above.

As should be appreciated from the foregoing, review activity page 400 enables an administrator or some other authorized user at a medical practice to reconcile bank deposits as frequently as desired, rather than reconciling the deposits once a month when the practice receives a bank statement from their bank. This is particularly advantageous for practices that receive large amounts of remittance and invest a significant amount of time preparing financial statements.

As shown in FIG. 4, review activity page 400 may be a portion of a user interface that includes other functionality for reconciling deposits. For example, the user interface may include a page for reconciling deposit batches to a specific bank statement for the associated bank account. Reconciling a bank statement may be performed, for example, once a month when the medical practice receives the statement from the bank. By matching (either automatically or manually) some or all of the deposit batches to bank deposits represented by mailbox deposits in the practice management system, the process of reconciling a monthly bank statement is more efficient. In some embodiments, when a medical practice receives a bank statement, information from the bank statement may be added to the practice management system via the user interface. For example, a user may enter the statement date, statement period, beginning and ending balance, miscellaneous transactions (e.g., not related to medical practice billing), and/or notes related to the bank statement.

Once the information from the bank statement has been entered, the practice management system may calculate a target amount based on the beginning balance, the ending balance, and the amount of the miscellaneous transactions. In reconciling the bank statement, it is desired to reconcile the deposit batch entries in the practice management system to this target amount. As the user is reconciling the deposit batches to the bank statement, the user interface may display an amount reconciled to the bank statement, and/or the difference between the target amount and the amount reconciled. The user may continue to reconcile the deposit batches to the bank statement until the difference is equal to $0, or until the user has otherwise finished reconciling the bank statement. In some embodiments, when the difference is equal to $0, the user interface may change the status of the deposit batch entries to "Reconciled," whereas the status may be changed to "Discrepancy" if the difference is not equal to $0 when the bank statement is closed.

In some embodiments, the user interface may enable the user to process and/or review multiple bank statements for reconciling with deposit batch entries in the practice management system. For example, a user interface in accordance with some embodiments of the invention may include a View Statements page that enables the user to view information for some or all of the bank statements that have been created for the medical practice.

Figure 9:
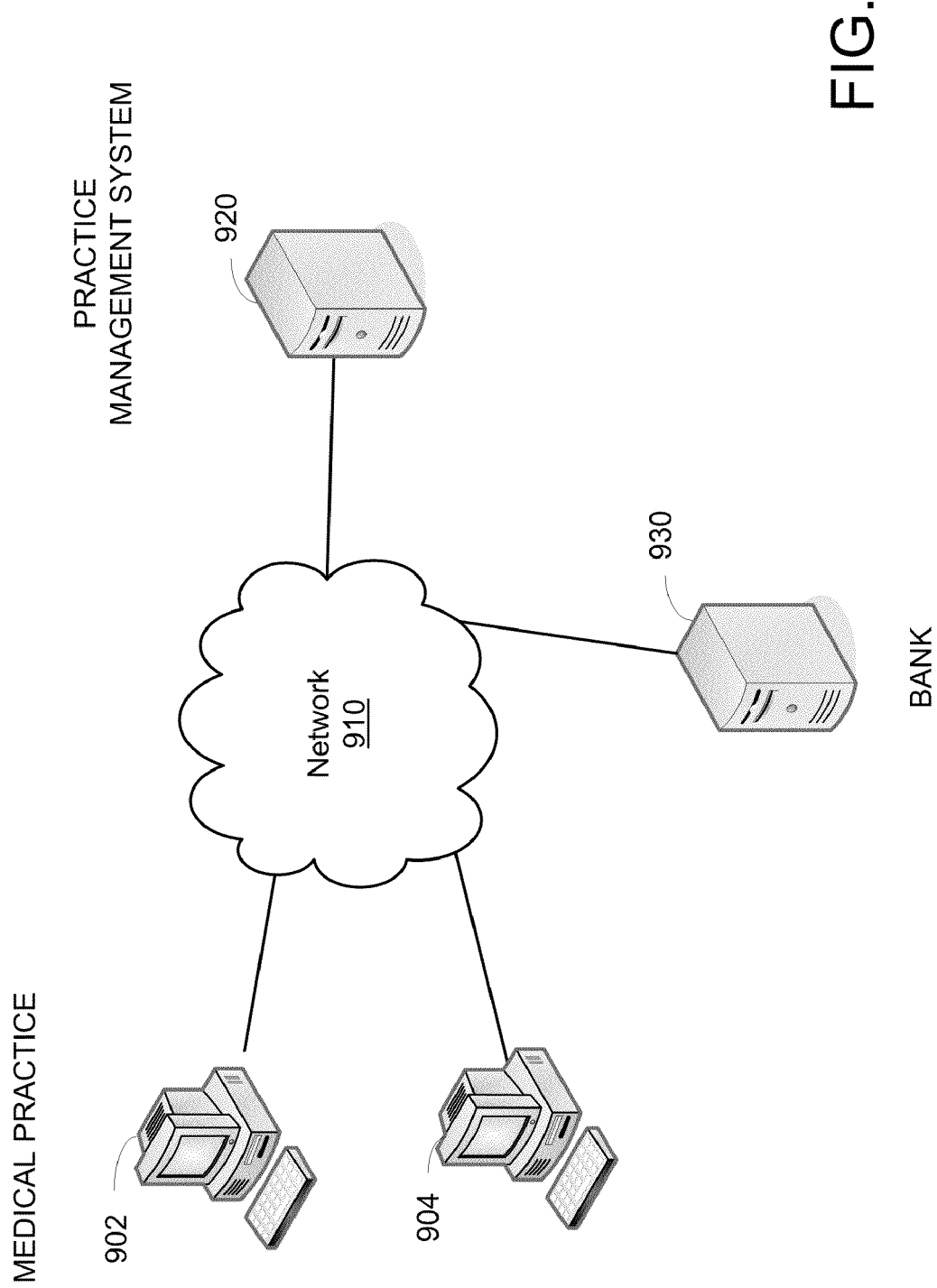
FIG. 9 is a schematic of a network environment in which some embodiments of the invention may be employed.

FIG. 9 illustrates an exemplary networked system on which some embodiments of the invention may be employed. Networked computers 902 and 904 located at a medical practice and computer 920 located at a location associated with a practice management system are shown connected to a network 910. Also connected to network 910 is a bank server 930. Network 910 may be any type of local or remote network including, for example, a local area network (LAN) or a wide area network (WAN) such as the Internet. In the example of FIG. 9, two networked computers are shown. However, it should be appreciated that network 910 may interconnect any number of computers of various types and the networked system of FIG. 9 is provided merely for illustrative purposes. For example, computer 920 may be connected via network 910 (or other networks) to a plurality of computers at a plurality of medical practice locations to provide practice management services to each of the connected medical practices. Additionally, computer 920 may be connected via network 910 (or other networks) to a plurality of computers at a plurality of banks for receiving bank transactions as described above. As should be appreciated from the foregoing, embodiments of the invention may be employed in a networked computer system regardless of the type or network size or configuration.

Having thus described several aspects of some embodiments of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a non-transitory computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The indefinite articles "a" and "an," as used herein, unless clearly indicated to the contrary, should be understood to mean "at least one."

The phrase "and/or," as used herein, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," shall have its ordinary meaning as used in the field of patent law.

As used herein in, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

The invention claimed is:

1. A method of reconciling a plurality of bank transactions with stored deposit entries in a practice management system, the method comprising:
   storing a plurality of deposit entries in a practice management system, wherein the plurality of deposit entries identify payment information sent to a bank on behalf of a payer;
   receiving from the bank, information describing the plurality of bank transactions;
   selecting, with at least one processor, bank deposits from the information describing the plurality of bank transactions;
   storing the bank deposits selected from the information describing the plurality of bank transactions as mailbox deposits in the practice management system;
   assigning, to each of the mailbox deposits, a category;
   automatically matching based, at least in part, on a plurality of rules, at least one of the mailbox deposits to one or more of the plurality of deposit entries stored in the practice management system, wherein the matching is performed based, at least in part, on the category assigned to the at least one of the mailbox deposits; and
   displaying a user interface configured to enable a user to identify bank deposits that have been automatically matched to stored deposit entries in the practice management system.

2. The method of claim 1, wherein the information describing the plurality of bank transactions is received as an electronic file, and
   wherein selecting the bank deposits comprises parsing the electronic file to identify the bank deposits based on the content of the plurality of bank transactions in the electronic file.

3. The method of claim 1, further comprising:
   determining that at least one of the mailbox deposits does not match any of the stored deposit entries; and
   creating at least one new stored deposit entry in the practice management system corresponding to the at least one non-matching mailbox deposit, wherein the at least one new stored deposit entry includes an identifier indicating that the at least one new stored deposit entry is an unposted deposit.

4. The method of claim 3, further comprising:
   receiving remittance verification that includes information indicating that the at least one non-matching mailbox deposit should be matched with the at least one new stored deposit entry corresponding to the at least one non-matching mailbox deposit; and
   automatically matching, in response to receiving the remittance verification, the at least one non-matching mailbox deposit with the at least one new stored deposit entry corresponding to the at least one non-matching mailbox deposit.

5. The method of claim 4, wherein the remittance verification is an electronic remittance advice and/or an explanation of benefits.

6. The method of claim 3, further comprising:
   determining that a predetermined amount of time has elapsed since the creation of the at least one new stored deposit entry; and
   initiating a manual follow-up procedure when it is determined that remittance verification has not been received during the predetermined amount of time.

7. The method of claim 1, wherein the plurality of rules comprises a rule configured to identify unmatched customer deposits and/or unmatched electronic funds transfers.

8. The method of claim 1, further comprising:
   displaying, on the user interface, at least one unmatched mailbox deposit and at least one unmatched stored deposit entry; and
   wherein the user interface is further configured to enable the user to manually match the at least one unmatched mailbox deposit with the at least one unmatched stored deposit entry.

9. The method of claim 1, wherein the user interface is further configured to enable the user to reconcile a bank statement with the stored deposit entries in the practice management system.

10. The method of claim 9, wherein the user interface is further configured to enable the user to store, on the practice management system, information associated with the bank statement.

11. At least one non-transitory computer-readable storage medium encoded with a plurality of computer-executable instructions that, when executed by at least one processor, perform a method of reconciling a plurality of bank deposits with stored deposit entries in a practice management system, the method comprising:
    storing a plurality of deposit entries in a practice management system, wherein the plurality of deposit entries identify payment information sent to a bank on behalf of a payer;
    receiving from the bank, information describing the plurality of bank transactions;
    selecting bank deposits from the information describing the plurality of bank transactions;
    storing the bank deposits selected from the information describing the plurality of bank transactions as mailbox deposits in the practice management system;
    assigning, to each of the mailbox deposits, a category;
    automatically matching based, at least in part, on a plurality of rules, at least one of the mailbox deposits to one or more of the plurality of deposit entries stored in the practice management system, wherein the matching is performed based, at least in part, on the category assigned to the at least one of the mailbox deposits; and
    displaying a user interface configured to enable a user to identify bank deposits that have been automatically matched to stored deposit entries in the practice management system.

12. The at least one non-transitory computer-readable storage medium of claim 11, wherein the information describing the plurality of bank transactions is received as an electronic file, and
    wherein selecting the bank deposits comprises parsing the electronic file to identify the bank deposits based on the content of the plurality of bank transactions in the electronic file.

13. The at least one non-transitory computer-readable storage medium of claim 11, wherein the method further comprises:
    determining that at least one of the mailbox deposits does not match any of the stored deposit entries; and
    creating at least one new stored deposit entry in the practice management system corresponding to the at least one non-matching mailbox deposit, wherein the at least one new stored deposit entry includes an identifier indicating that the at least one new stored deposit entry is an unposted deposit.

14. The at least one non-transitory computer-readable storage medium of claim 13, wherein the method further comprises:
receiving remittance verification that includes information indicating that the at least one non-matching mailbox deposit should be matched with the at least one new stored deposit entry corresponding to the at least one non-matching mailbox deposit; and
automatically matching, in response to receiving the remittance verification, the at least one non-matching mailbox deposit with the at least one new stored deposit entry corresponding to the at least one non-matching mailbox deposit.

15. The at least one non-transitory computer-readable storage medium of claim 13, wherein the method further comprises:
displaying, on the user interface, at least one unmatched mailbox deposit and at least one unmatched stored deposit entry; and
wherein the user interface is further configured to enable the user to manually match the at least one unmatched mailbox deposit with the at least one unmatched stored deposit entry.

16. The at least one non-transitory computer-readable storage medium of claim 11, wherein the user interface is further configured to enable the user to:
store, on the practice management system, information associated with a bank statement; and
reconcile a bank statement with the stored deposit entries in the practice management system.

17. A computer system, comprising:
at least one processor programmed to:
store a plurality of deposit entries in a practice management system, wherein the plurality of deposit entries identify payment information sent to a bank on behalf of a payer;
receive from the bank, information describing the plurality of bank transactions;
select bank deposits from the information describing the plurality of bank transactions;
store the bank deposits selected from the information describing the plurality of bank transactions as mailbox deposits in the practice management system;
assign, to each of the mailbox deposits, a category;
automatically match based, at least in part, on a plurality of rules, at least one of the mailbox deposits to one or more of the deposit entries stored in the practice management system, wherein the matching is performed based, at least in part, on the category assigned to the at least one of the mailbox deposits; and
display a user interface configured to enable a user to identify bank deposits that have been automatically matched to stored deposit entries in the practice management system.

18. The computer system of claim 17, wherein the information describing the plurality of bank transactions are received as an electronic file, and
wherein selecting the bank deposits comprises parsing the electronic file to identify the bank deposits based on the content of the plurality of bank transactions in the electronic file.

19. The computer system of claim 17, wherein the at least one processor is further programmed to:
display, on the user interface, at least one unmatched mailbox deposit and at least one unmatched stored deposit entry; and
wherein the user interface is further configured to enable the user to manually match the at least one unmatched mailbox deposit with the at least one unmatched stored deposit entry.

* * * * *